US 6,654,670 B2

(12) United States Patent
Kakinami et al.

(10) Patent No.: US 6,654,670 B2
(45) Date of Patent: *Nov. 25, 2003

(54) PARKING ASSISTING APPARATUS

(75) Inventors: Toshiaki Kakinami, Aichi-ken (JP); Shoji Kawata, Aichi-ken (JP)

(73) Assignee: Aisin Seiki Kabushiki Kaisha, Aichi-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/540,903

(22) Filed: Mar. 31, 2000

(65) Prior Publication Data

US 2002/0128750 A1 Sep. 12, 2002

(30) Foreign Application Priority Data

Mar. 31, 1999 (JP) ............................. 11-091831

(51) Int. Cl.[7] ............................. G05D 1/00; H04N 7/00
(52) U.S. Cl. ............................. 701/1; 348/119
(58) Field of Search .............................. 701/1, 41, 36, 701/45, 117, 224, 300–302; 180/204, 271, 280, 282; 345/113, 967, 972; 348/113, 116, 119, 143, 148

(56) References Cited

U.S. PATENT DOCUMENTS

| 5,587,938 A | 12/1996 | Hoetzel |
| 6,170,591 B1 * | 1/2001 | Sakai et al. ................. 180/204 |

FOREIGN PATENT DOCUMENTS

| DE | 43 33 112 A1 | 3/1995 | |
| JP | 59-201082 | 11/1984 | |
| JP | 01 014 700 A | 1/1989 | |
| JP | 7-17328 | 1/1995 | |
| JP | 8-2357 | 1/1996 | |
| JP | 10-175482 | * 6/1998 | ............. B60R/1/00 |
| JP | 11-334470 | 12/1999 | |

* cited by examiner

Primary Examiner—Thu Nguyen
(74) Attorney, Agent, or Firm—Sughrue Mion, PLLC

(57) ABSTRACT

A parking assisting apparatus is provided in which even a beginner can relaxedly park a vehicle and parking operation is pertinently assisted. The apparatus provides a cameras 1 for taking an image rearwardly of a vehicle during parking the vehicle. The image from the camera is displayed on a display 13 provided inside the vehicle as a rear image and a running prediction locus 20 is displayed which varies in accordance with the state of a steering wheel angle to overlap the rear image. A longitudinal line parking switch 4b instructs the vehicle to park along a longitudinal line and when the longitudinal line parking is instructed there is displayed a running prediction locus 20a having a point of inflection in accordance with the steering wheel angle.

14 Claims, 12 Drawing Sheets

Fig. 7

Steering sensor neutral point processing ( Timer interruption )

↓

| Read right wheel signal → NR & clear NR | — S301

↓

| Read left wheel signal → NL & clear NL | — S302

↓

| Calculate vehicle speed from NR, NL → V | — S303

↓

S304: V > 10 Km/h ? — NO → RETURN; YES ↓

S305: NR ≃ NL ? — NO → RETURN; YES ↓

S306: 0 → N

↓

( RETURN )

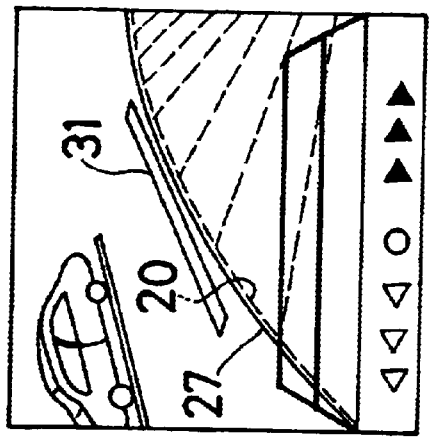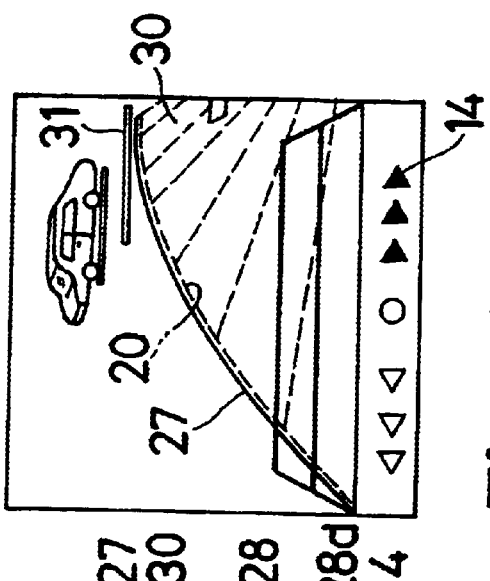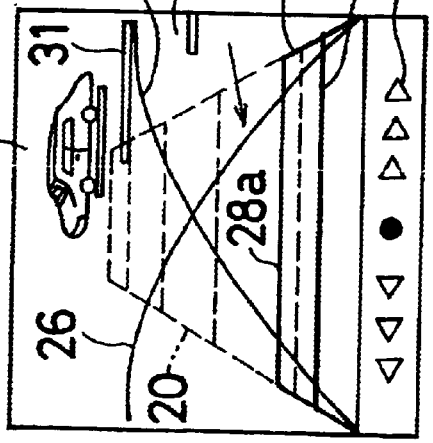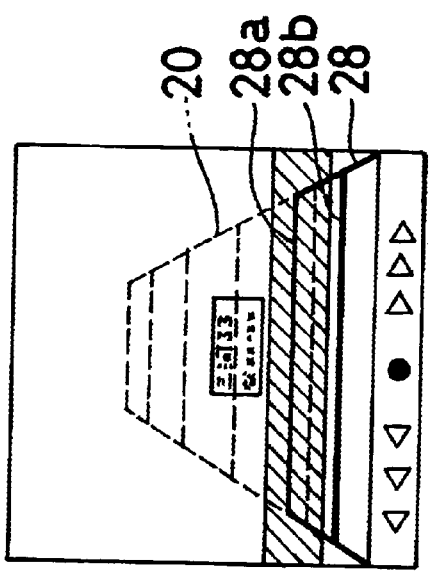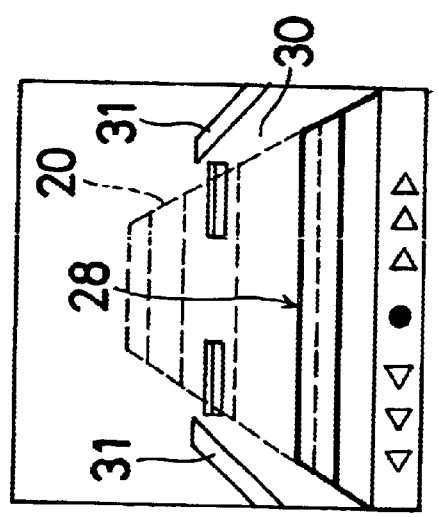

Vehicle can be parked along a longitudinal line when turned by θ constituting R(1−cosθ)×2=D D=Wv+d

PARKING ASSISTING APPARATUS

BACKGROUND OF THE INVENTION

1. Field of the Invention

The present invention relates to a parking assisting apparatus for assisting parking of a vehicle, particularly to a parking assisting apparatus for sampling a rear image by a camera, displaying the rear image on a display in the vehicle and assisting a driver in the parking operation.

2. Description of the Related Art

Conventionally, there has been known a method of assisting a beginner unaccustomed to parking such as parking a vehicle lengthwise side by side in a row or backing a vehicle rearwardly into a parking space in the parking operation. For example, according to Japanese Patent Laid-Open No. 17328/1995, a CCD camera or a distance sensor for measuring a distance is provided on a vehicle body, the area adjacent the vehicle is inspected and an image of the area adjacent the vehicle is displayed on a display monitor provided in the compartment of the vehicle to thereby provide a driver with a view of the surrounding area.

Further, according to Japanese Patent Laid-Open No. 201082/1984, there is known a method in which the steering wheel angle is detected by a steering sensor and a steering wheel operating angle is calculated and outputted by a simplified display. Further, according to Japanese Patent Laid-Open No. 2357/1996, there is also known a method in which a distance between a vehicle and an obstacle (particularly, a vehicle parking contiguous to a parking space to which a driver intends to park the vehicle being driven) is measured by a distance measuring sensor for detecting an object adjacent the rear of the vehicle, a position of starting to turn the steering wheel by a maximum steering angle is detected in accordance with the distance and the wheel turning start position is informed to the driver.

However, according to the above-described conventional methods, an obstacle adjacent a vehicle is detected by using various sensing technologies as a premise and a system for the processing becomes complicated. Further, according to the method of measuring the distance to an obstacle in the vicinity by the distance measuring sensor and informing the driver of the distance, it is difficult to deal with a case in which there is no vehicle parking contiguously to a parking space or a case of abrupt rush by a person and accordingly, the parking operation is not properly assisted.

Hence, in order to resolve such problems, a parking assisting apparatus was proposed with the object of assisting the parking operation by a simplified method and providing a driver with pertinent, useful information in the parking operation in Japanese Patent Laid-Open No. 334470/1999. According to the apparatus, the space adjacent the rear side of a driving vehicle is scanned by a camera installed on the rear side of the vehicle and an image sampled by the camera is displayed on a display in the vehicle as a rear image and in the steering operation, a running prediction locus which is varied depending on a steering wheel angle of the vehicle is displayed to overlap the rear image to thereby assist the driver in the parking operation at a right angle.

However, according to such an apparatus for displaying the running prediction locus to overlap the rear image, when parking a vehicle rearwardly, there is achieved an advantage of being capable of providing the driver with useful information of the surroundings, when the apparatus is actually used, particularly in parking along a longitudinal line, the steering wheel needs to turn back in the midst of operation. It is difficult to determine the timing of how much the steering wheel is to be turned and thereafter turned back. The timing is difficult for a beginner driver having a short driving history and skill to some degree is needed.

SUMMARY OF THE INVENTION

Hence, the invention has been carried out in view of the above-described problems and it is the technical problem of the invention to provide a parking assisting apparatus capable of carrying out the operation of parking relaxedly even by a beginner and pertinently assisting the driver in a parking operation.

In order to resolve the above-described problems, according to an aspect of the invention, there is provided a parking assisting apparatus for taking an image of the area adjacent the rear side of a vehicle by a camera (17) in a parking operation, displaying an image from the camera on a display (13) provided inside the vehicle as a rear image and displaying a running prediction locus (20) varied in accordance with the state of a steering wheel angle to overlap the rear image, said parking assisting apparatus (1) comprising:

parking instructing means (4b) for instructing a driver how to park the vehicle along a longitudinal line and running prediction locus displaying means (9, 11, 12, 13) for displaying the running prediction locus (20a) having a point of inflection in accordance with the steering wheel angle when the vehicle is being parked along the longitudinal line by the parking instructing means.

Accordingly, when the vehicle is being parked along the longitudinal line by the parking instructing means, the running prediction locus having the point of inflection is displayed in accordance with the steering wheel angle and accordingly, in the case of parking the vehicle along the longitudinal line, the driver can know, while staying at an initial position, whether the vehicle can be parked along the horizontal line at a parking space on the rear side based on the running prediction locus having the point of inflection (for example, substantially constituting an S-like shape). In this case, a steering amount necessary for parking the vehicle along the longitudinal line can be known at an initial stage of the parking operation and therefore even a beginner can relaxedly park the vehicle.

According to the running prediction locus, when the longitudinal line parking of the vehicle is displayed within a predetermined range (L in FIG. 15) by which the vehicle can be parked along the longitudinal line in accordance with characteristics of the vehicle and a marker (20b) is displayed at a vicinity of a rear side face of the running prediction locus (20a), operation and determination by a display portion of the displayed marker can pertinently be carried out based on the marker.

When there are further provided regressing state detecting means (3, 5, 6) for detecting a regressing state of the vehicle and inflection point determining means (11) for determining a point of inflection (PT) in parking the vehicle along the longitudinal line by he characteristics of the vehicle when the vehicle starts regressing and before the vehicle reaches the point of inflection, the running prediction locus is switched to and displayed by the running prediction locus (20) at and after the point of inflection in accordance with the steering wheel angle, the regressing state can be detected and an operational state up to the point of inflection can be known in compliance with an actual rear image by the position of the marker. That is, timing of how much a steering wheel is to be turned and thereafter turned back becomes easy to determine on a screen where the rear side is displayed by the marker.

Further, in the case in which the position of the marker becomes parallel with a road side or a curb stone (40) or when an end portion (20c) of the running prediction locus becomes parallel with a vehicle parked rearwardly the vehicle being parked along the longitudinal line, the vehicle is regarded to reach the point of inflection and display of the running prediction locus is switched. After the vehicle passes through the point of inflection, the running prediction locus is displayed in accordance with the steering wheel angle in conformity with a rear side vehicle in parking or the steering wheel angle is displayed on a straight line to indicate a neutral state or the display screen is distinguished to thereby change the display mode and an operational state can be made easy to understand for the driver.

BRIEF DESCRIPTION OF THE DRAWINGS

FIGS. 3A and 3B show a steering sensor according to the embodiment of the invention in which FIG. 3A is a plane view of the steering sensor when the steering sensor is attached to a steering column shaft and FIG. 3B is a perspective view showing an outline of a slit plate and a photointerrupter of the steering sensor;

FIG. 7 is a flowchart showing a neutral point processing of the steering sensor of the controller according to the embodiment of the invention;

FIGS. 9A, 9B and 9C are views showing display examples of the running prediction locus according to the embodiment of the invention in which FIG. 9A is a view showing a display by predicted ruts, FIG. 9B is a view showing a display of a running area belt having a width of a vehicle and FIG. 9C is a view showing a display in a ladder-like shape;

FIGS. 13A, 13B, 13C 13D and 13E illustrate examples of a display screen showing a display according to the embodiment of the invention;

FIGS. 16A, 16B and 16C are views showing changes of the running prediction locus when parking along a longitudinal line according to the embodiment of the invention in which FIG. 16A shows a state in which a position of the vehicle is disposed at position "a" shown by FIG. 14, FIG. 16B shows a state in which the position of the vehicle is disposed at a turn back point PT and FIG. 16C shows a state in which the position of the vehicle is disposed at position "c" shown by FIG. 14.

DETAILED DESCRIPTION OF THE PREFERRED EMBODIMENTS

An explanation will be given of embodiments according to the invention in reference to the drawings as follows.

Figure 1:
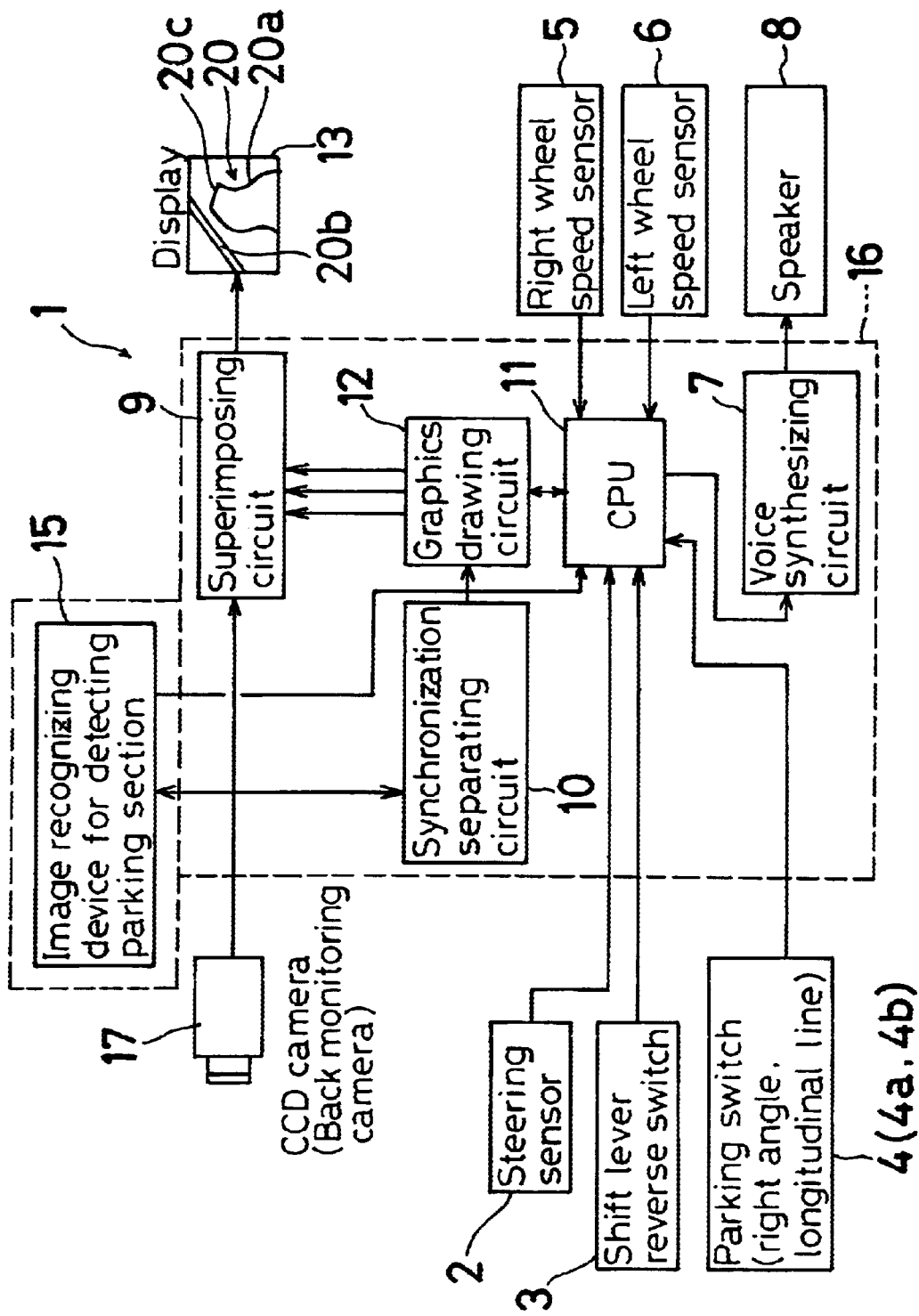
FIG. 1 is a system diagram of a parking assisting apparatus according to an embodiment of the invention.

FIG. 1 is a system diagram of a parking assisting apparatus 1. In the drawing, a controller 16 for controllineg the parking assisting apparatus 1 is inputted with signals from a CCD camera (hereinafter, referred to as camera) 17 for taking an image from a rear side of a vehicle, a steering sensor 2 for detecting a steering wheel operating angle (also referred to as steering wheel turning angle) of a steering wheel (steering) 21, a shift lever reverse switch 3 for detecting a reverse (regressing) state of a shift lever of a transmission, a parking switch 4 including a right angle parking switch 4a and a longitudinal line parking switch 4bfor operating a parking assisting function in a parking operation for carrying out right angle parking or parking along a longitudinal line which is carried out in normal parking or parking a vehicle in a parking lot and wheel speed sensors 5 and 6 for detecting left and right wheel speeds of driven wheels. The controller 16 can display a rear image from the vehicle and a running prediction locus 20, described later, on a display 13 based on these signals. Further, the apparatus 1 is provided with a voice synthesizing function whereby a synthesized voice is outputted by a voice synthesizing circuit 7 and an output by voice synthesizing is emitted from a speaker 8 to the driver.

The controller 16 is provided with a CPU 11 for governing control; a graphics drawing circuit 12 for drawing graphics on the display 13, a superimposing circuit 9 for overlapping a graphics signal and the rear image from the camera 17, a synchronization separating circuit 10 for sampling a synchronizing signal from the image of the camera and supplying the synchronizing signal to the graphics drawing circuit 12 and an image recognizing device 15 for detecting a parking space which recognizes an image of a parking space 30 by receiving a signal from the camera 17. Further, the image recognizing device 15 can be provided separately from the controller 16.

The display 13 is also provided with steering wheel angle display markers 14, the lighting states of which are changed depending on the state of the steering wheel angle. The left side markers, the right side markers or the middle marker of the display markers 14 may be lighted to indicate which direction the steering wheel 21 is being turned. Further, the steering wheel angle referred to here may be the steering wheel operating angle or turning angle from a neutral position in turning the steering wheel 21 or may be an actual steering angle of left and right wheels relative to a progressing direction. A detailed explanation is omitted with respect to voice synthesizing in image recognition of the parking space 30 and a parking operation.

Figure 2:
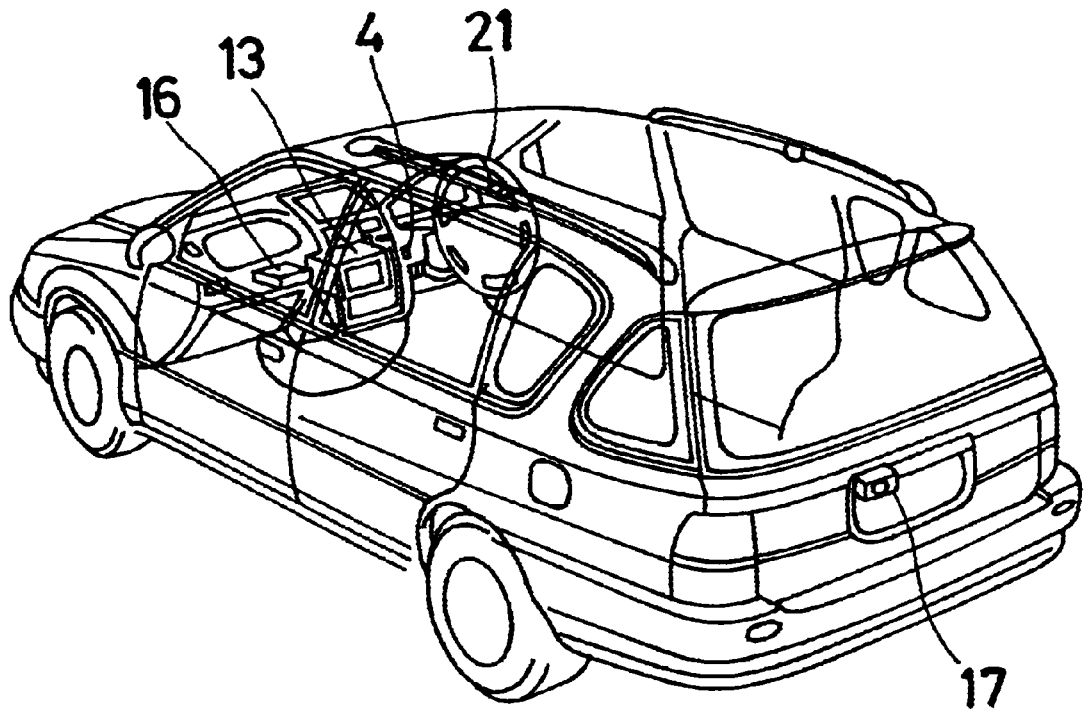
FIG. 2 is a view of the parking assisting apparatus according to the embodiment of the invention when mounted on a vehicle.

FIG. 2 shows a view of the parking assisting apparatus 1 mounted on a vehicle. The camera 17 for taking the rear image is attached to the vicinity of an upper central portion of a license plate holder on the rear side of the vehicle and is installed whereby an optical axis thereof is directed downwardly from a horizontal plane. Specifically, the camera 17 is attached to the center of the rear side of the vehicle in a state in which an angle θ downwardly inclined from the horizontal plane is about 30 degrees and the camera per se ensures a field of view from left to right of 140 degrees by a wide angle lens and can take an image of an area up to about 8 m rearwardly.

Further, the display 13 is mounted on a panel face of a center console in the compartment of the vehicle and the controller 16 is installed inside of an upper portion of a glove box. Further, the parking switch 4 requesting parking assistance in the parking operation is installed at a vicinity of the center console which is easy to operate by the driver.

Figure 3A:
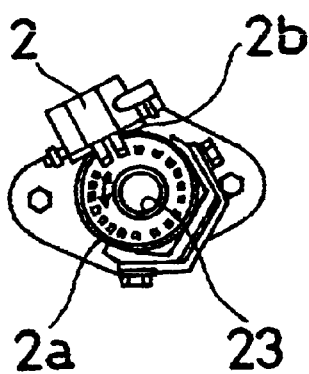
Figure 3B:
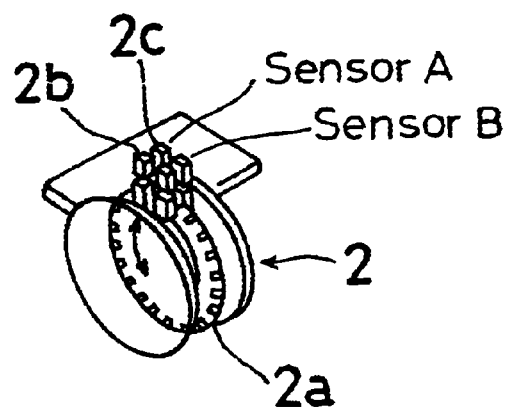
Figure 4:
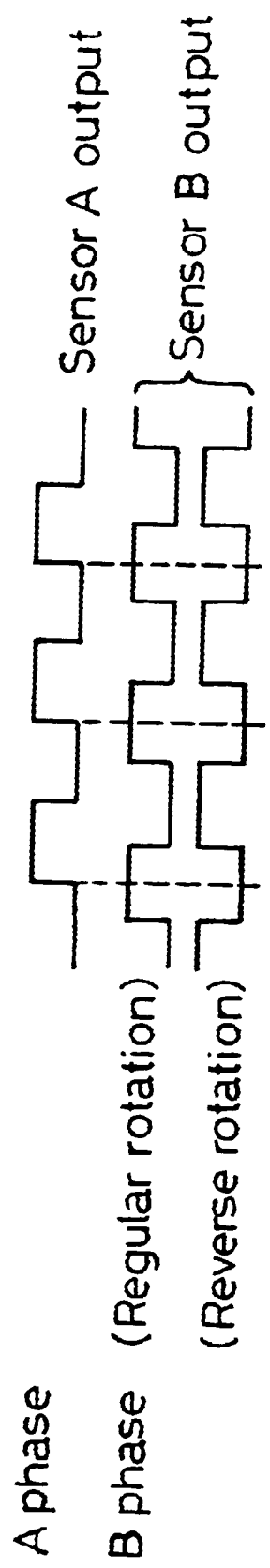
FIG. 4 illustrates timing charts showing outputs at phase A and phase B of the steering sensor shown in FIGS. 3A and 3B.

Next, an explanation will be given of the steering sensor 2 with reference to FIGS. 3A and 3B. The steering sensor 2 is used for detecting the operating angle of the steering wheel 21. The steering sensor 2 includes a slit plate 2a adapted to rotate integrally with a steering column shaft 23 and two sets of photointerrupters 2c and 2b having a phase difference of 90 degrees therebetween. According to the operation, by rotating the disk plate 2a with a plurality of peripheral slits, phototransistors are turned ON/OFF by passing or shielding light to thereby output two signal pulses having phase A and phase B (refer to FIG. 4). Accordingly, the phase B is outputted with a phase 90 degree retarded or advanced relative to the phase A depending on the direction of rotating the steering wheel 21 and in this case, the steering wheel angle is changed by 1 degree/pulse.

Figure 5:
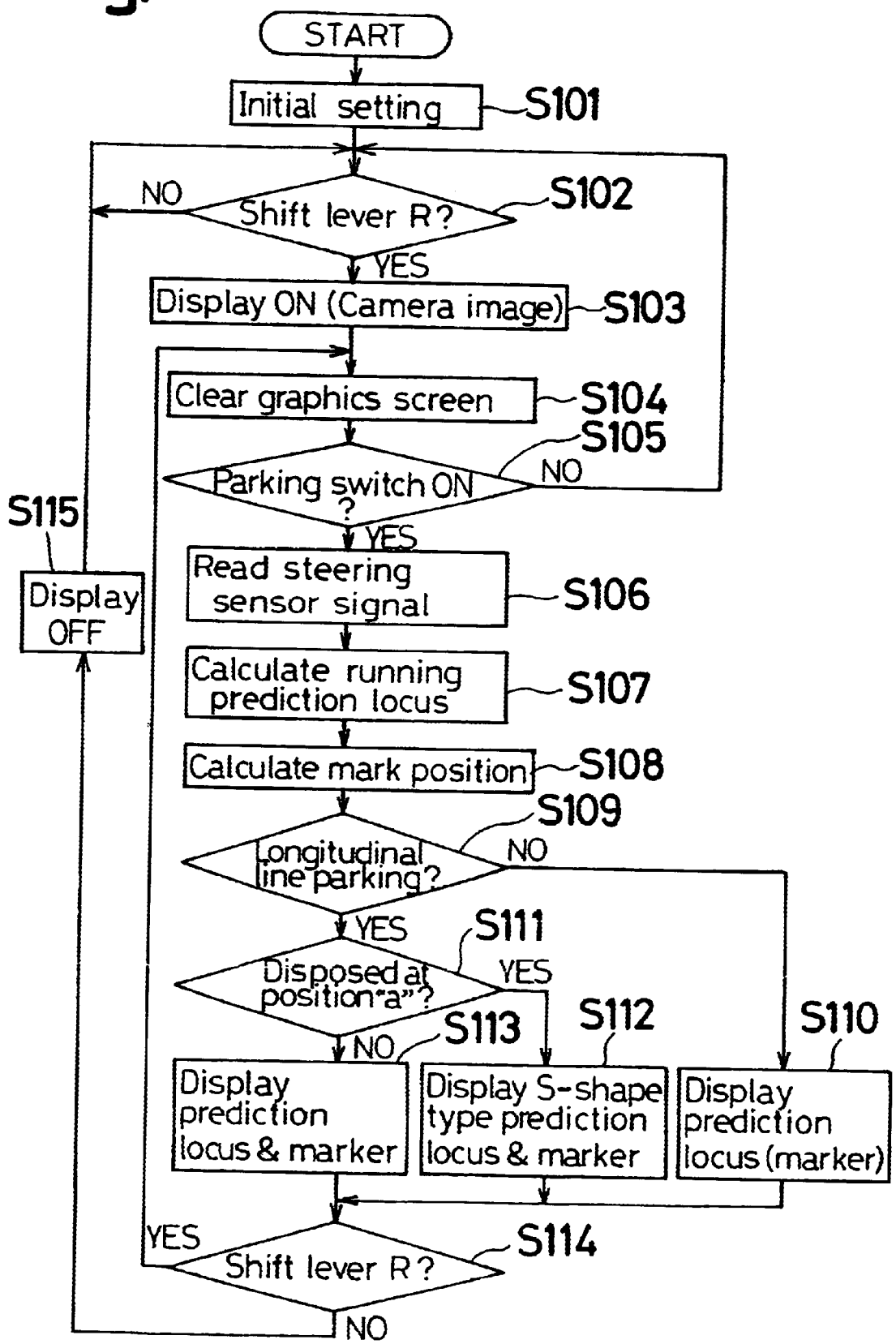
FIG. 5 is a flowchart showing processing of a controller according to the embodiment of the invention.

Next, an explanation will be given of the processes carried out by the controller 16 in reference to FIG. 5. In the controller 16, by turning the power supply ON by a switch (not illustrated) installed in the vehicle, the program shown by FIG. 5 is executed. First, at initial step S101, various initial values necessary for the processing are set and at succeeding step S102, a state of the shift lever reverse switch 3 is checked. At this occasion, when the shift lever reverse switch 3 is not set to reverse the processing at step S102 and later steps are not carried out and parking assistance is not carried out.

When the shift lever reverse switch 3 is ON (state of reverse), the process at step S103 is carried out. At step S103, the display 13 is switched to a camera image mode to thereby provide a mode capable of displaying an image adjacent the rear side of the vehicle as a live image and in this state, normal back-up monitoring is carried out.

Figure 6:
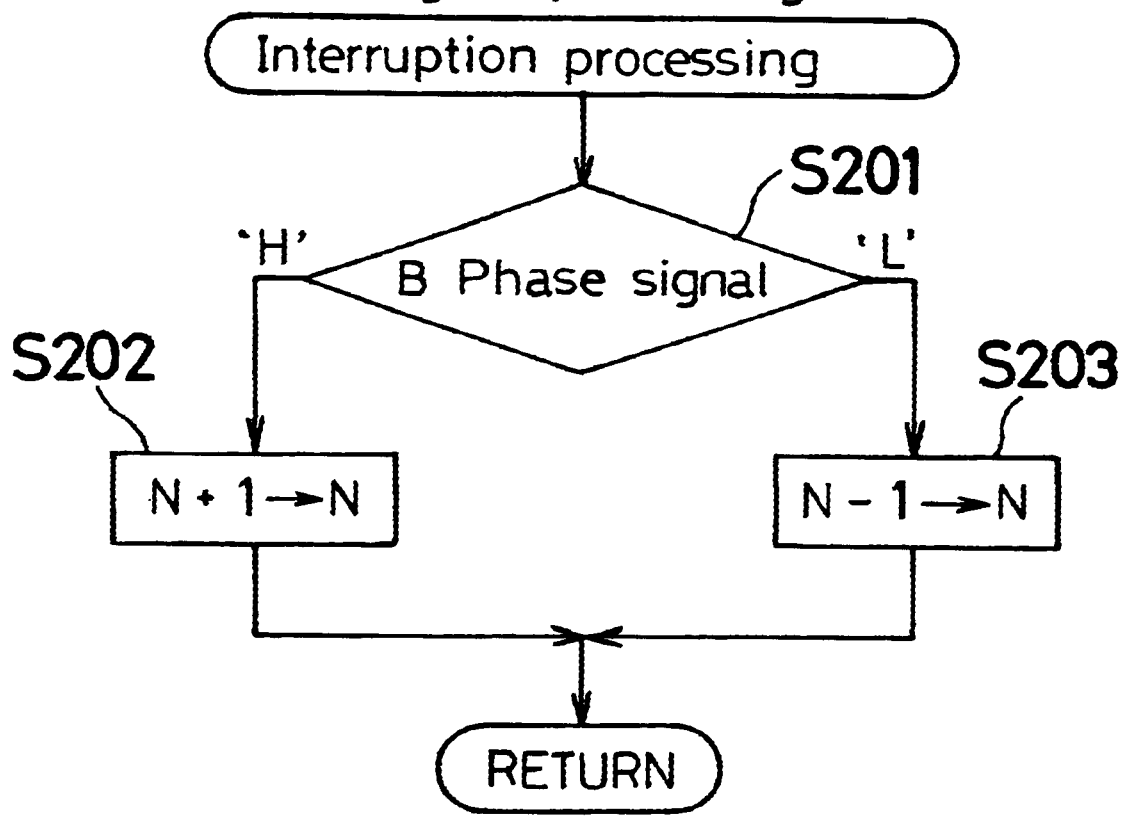
FIG. 6 is a flowchart showing signal processing of the steering sensor of the controller according to the embodiment of the invention.

Next, at step S104, only a graphics screen drawn to overlap the rear image is cleared and at step S105, the state of the parking switch 4 is determined, that is, which of the switches 4a and 4b of the parking switch 4 is operated or depressed. At this occasion, when the driver does not need parking assistance and the parking switch 4 is not depressed, the operation returns to step S102 and parking assistance is not carried out. However, when the parking switch is operated by the driver, at step S106, a steering sensor value N is read from the steering sensor 2 and based on the steering sensor value N, a turning radius R in a parking operation is calculated. Specifically, in reading the steering sensor 2, when a rising edge of the A phase signal is detected, a main program is interrupted and an interruption processing shown by FIG. 6 is executed. That is, at step S201 of FIG. 6, the state of the B phase signal is checked and when the B phase signal is at high potential H, at step S202, the steering count value N is incremented and when the B phase signal is at low potential L, the steering count value N is decremented and the steering count value is stored in a memory. In this case, with regard to the steering count value N, θ−N is established since 1 pulse corresponds to 1 degree.

However, the absolute steering wheel angle of the steering wheel 21 becomes indefinite by only counting the steering value N, shown above, and accordingly, a neutral point of the steering wheel angle is detected by a neutral point processing shown by FIG. 7 and the neutral point is determined as N=0. Now, an explanation will be given of the determination of the neutral point with reference to FIG. 7. The processing is executed by timer interruption at a period of one second. At this occasion, normally, vehicle body speed is also calculated by signals from the left and right well known wheel speed sensors 5 and 6 installed on the wheels.

At step S301 and step S302, signals (pulses) of the left and right wheel speed sensors 5 and 6 are counted by a hardware counter built in CPU 11 within the controller, the left and right wheel speeds are read by the timer interruption routine and supplied to portions NR and NL of the memory where values of the wheel speed sensors are stored. After the reading operation, the counter per se is cleared and the portions NR and NL designate numbers of pulses per second.

At the next step S303, an average value (NR+NL)/2 is calculated from NR and NL and the average value is multiplied by a peripheral length of tire and vehicle speed V is easily calculated by a well known method. Next, in setting a reference to the steering sensor 2, at step S304 through step S306, when the vehicle speed V is equal to or larger than a predetermined speed (10 km/h), in a state in which there is almost no difference between pulses of the left and right wheel speed sensors 5 and 6, the vehicle is regarded to progress on a straight line and at step S306, the steering counter value N is nullified and reset to thereby calculate the neutral point of the steering wheel angle.

When the steering wheel angle θ has been calculated, the operation returns to the main routine of FIG. 5 and at succeeding step S107, the running prediction locus 20 (20a) is calculated as follows.

Figure 8:
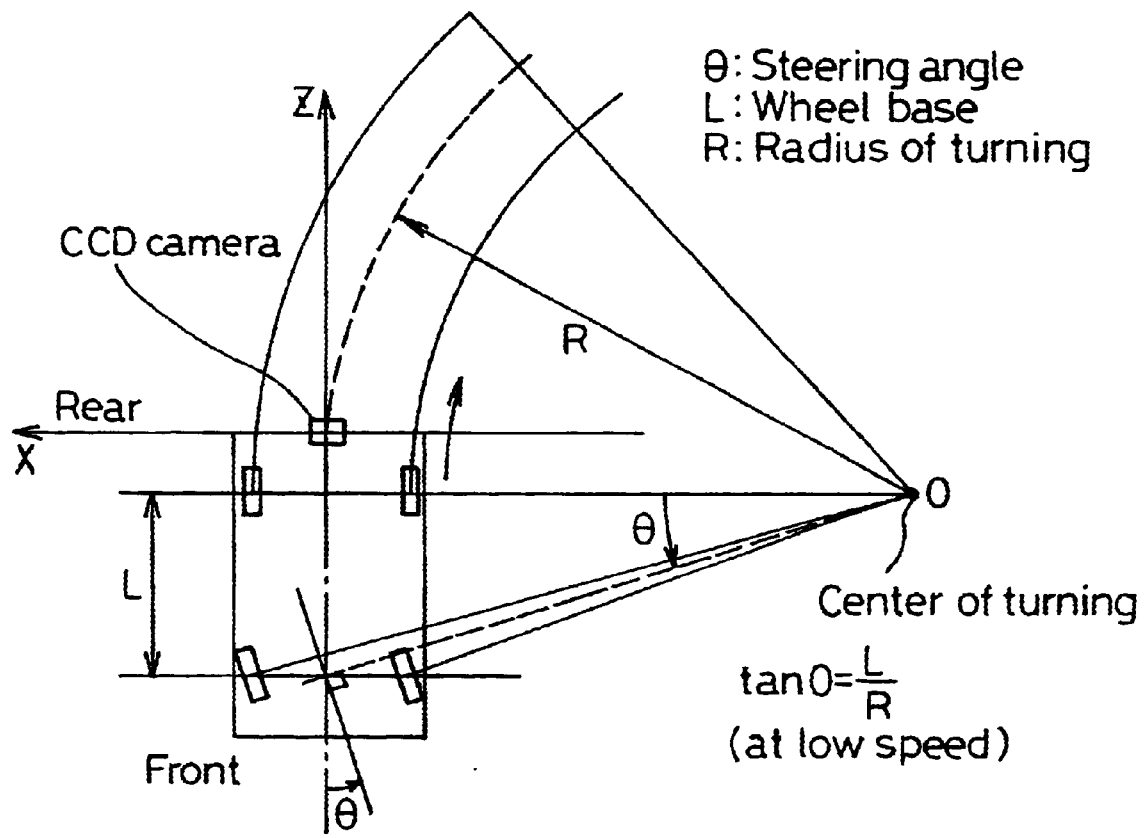
FIG. 8 is an explanatory view used in calculating a running prediction locus according to the embodiment of the invention.

As shown by FIG. 8, a center of turning 0 at low speed (in this case, 10 Km/h or lower), is present on an extension line of wheel shafts on the rear side of the vehicle and by a geometrical relationship, the radius of turning R is calculated by an equation of R=L/tar θ from the steering wheel operating angle θ and a wheel base L of the vehicle. In this case, when the steering wheel angle is θ−0, there is brought about a state in which the vehicle is progressing on a straight line and the radius of turning becomes R=∞.

Figure 10:
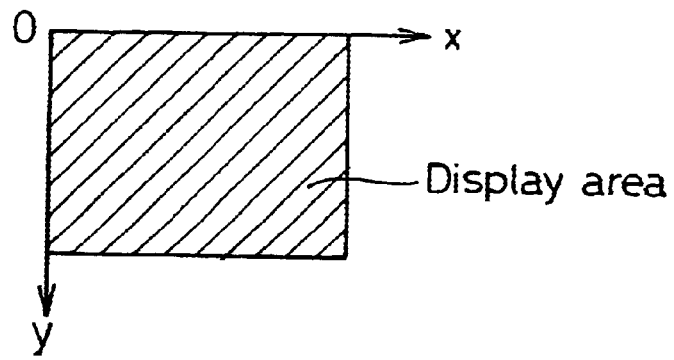
FIG. 10 is a graphic display of coordinates of a camera and a display according to the embodiment of the invention.
Figure 11:
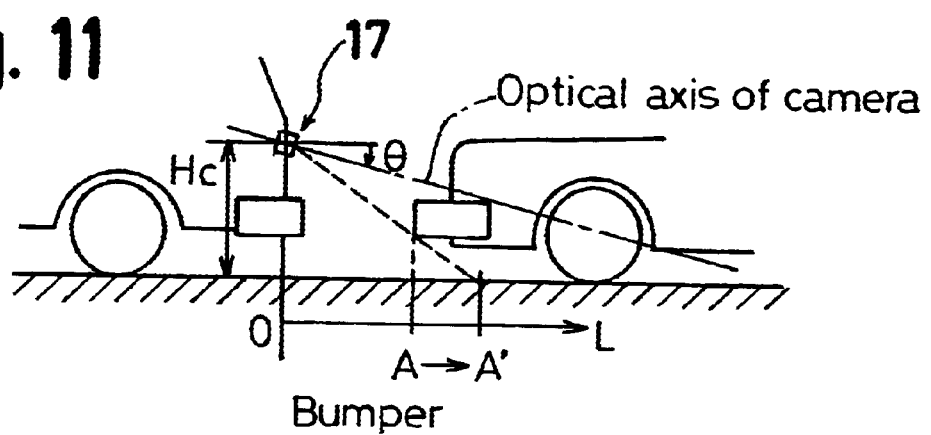
FIG. 11 is a view showing a mounting state when a camera of the parking assisting apparatus is mounted on the vehicle according to the embodiment of the invention.
Figure 12:
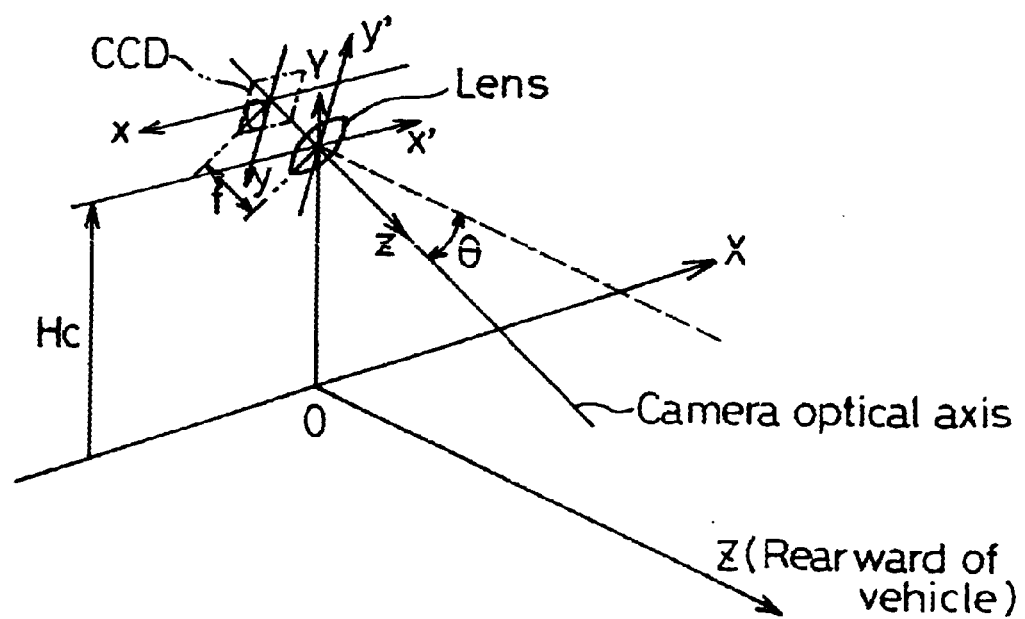
FIG. 12 is an explanatory view for explaining a method of converting coordinates of the parking assisting apparatus according to the embodiment of the invention.

FIG. 10 shows graphic display coordinates (x, y) in view from the camera and FIG. 12 shows a method of coordinate conversion, by using the illustrated coordinate system. As shown by FIG. 11, the camera 17 used here is attached to the rear side of the vehicle such that an optical axis thereof is inclined by θ=30 downwardly from the horizontal state at a height above a road face by Hc and a lens of the camera 17 is provided with a wide angle and a deep focal depth and is able to draw an image of the road face by a CCD device. Accordingly, the following mapping relationship is established between a road face coordinate system (X, Z) and the coordinate system (x, y) on the display.

Specifically, when notation (X, Y, Z) designates the road face coordinates, notation (x, y) designates the camera coordinates on the CCD element face, notation "f" designates a focal distance of the camera, notation (x', y', z') designates coordinates of the lens, notation θ designates a camera mounting angle and notation Hc designates a camera mounting height from the road face, the following relationships are established.

$$X=f \cdot x'/z', \quad y=f \cdot y'/z' \quad (1)$$

setting x'=X, $$y=Z \sin \theta + (Y-Hc)\cos \theta \quad (2)$$

$$z'=Z \cos \theta - (Y-Hc)\sin \theta \quad (3)$$

In this case, when the coordinate system (X, Y, Z) is limited to that on the road face, Y=0 is established and when "x" and "y" are calculated by the above-described relationships, the following equations are established.

$$x=f \cdot X/(Z \cos \theta + Hc \cdot \sin \theta) \quad (4)$$

$$y=f \cdot (Z \sin \theta + Hc \cos \theta)/(Z \cos \theta + Hc \cdot \sin \theta) \quad (5)$$

That is, the coordinates (x, y) on the graphics screen of the display in the case of taking an image of a point (X, Z) on the road face by the camera 17 can be calculated by the relationships (4) and (5).

Figure 9:
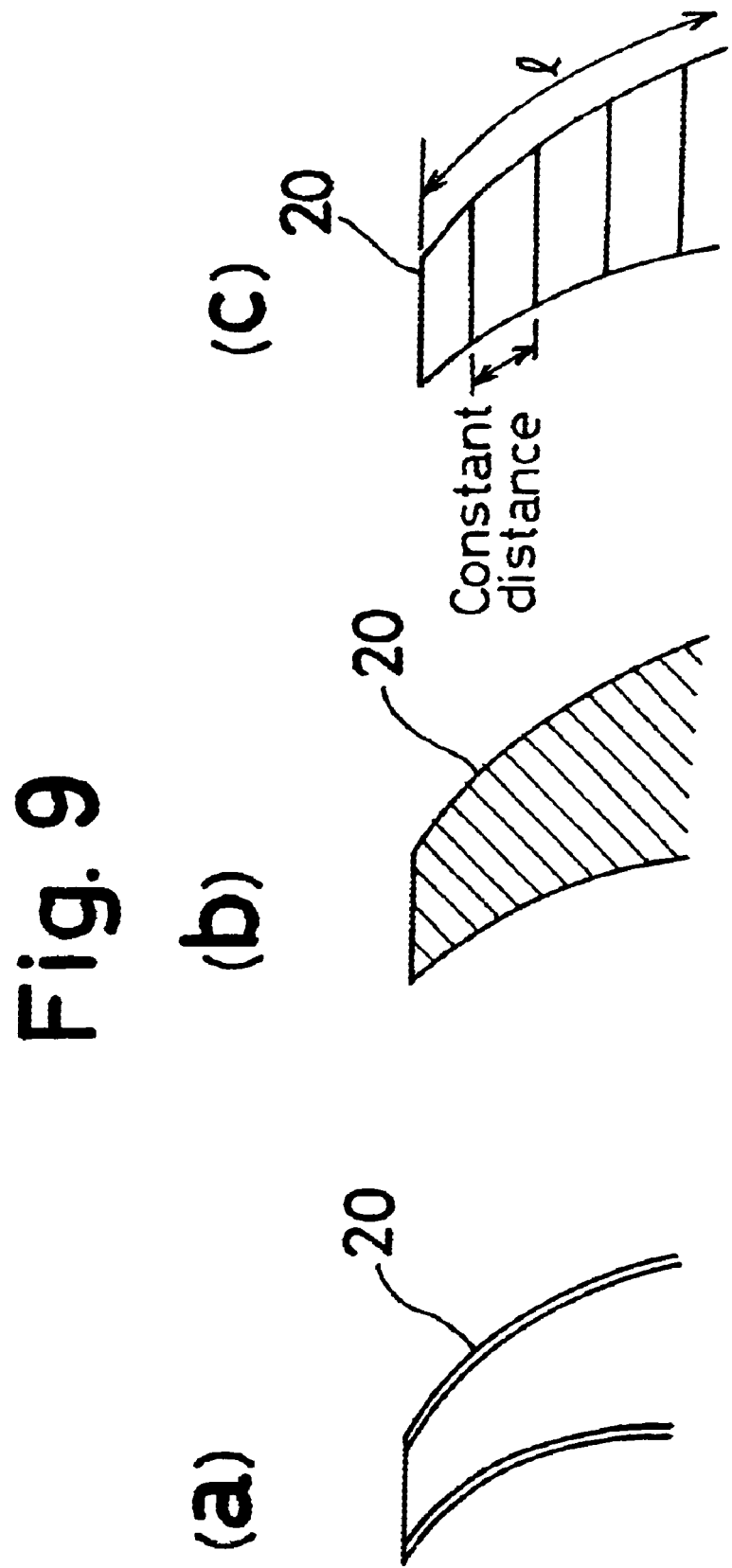

When the running prediction locus 20 of the camera coordinates (x, y) is displayed on the display, in the case of a mode of parking in which a front portion of the vehicle is directed in the right angle direction as in parking the vehicle into a garage or a parking lot (in this case, referred to as right angle parking), various display methods are conceivable as shown by FIGS. 9A, 9B and 9C. There is a method of displaying by predicted ruts on which the left and right wheels of the vehicle pass as shown by FIG. 9A, a method of displaying a running area on which the vehicle runs in parking by vectors as shown by FIG. 9B and a method of displaying a ladder-like shape such that an interval of a constant distance (ladder interval: 50 cm) can be known and in this case, there is adopted a method by which the distance is easy to feel and angles of the vehicle body at respective positions are easy to see in the parking operation as shown by FIG. 9C. In this case, the length l of the running prediction locus 20 is constituted by a fixed length (for example, 3 m in right angle parking) or a constant amount of angle and with regard thereto, there can be adopted a method in which the color of the display is changed between a turning state (set to green color) and a straight progressing state (set to blue color) or a method in which only a front end portion of a predicted locus is displayed so as to be easy to differentiate.

At step S108, there is calculated a display position of a marker 20b constituting a determination reference of how much steering is needed in the parking operation. Although a description will be given of the marker 20b later, the marker is displayed in the vicinity of a rear end of the running prediction locus 20 (in this case, a location remote from a side portion of the rear end in the vehicle width direction by, for example, a predetermined distance of 30 cm) and the marker is displayed by a partial straight line or a partial curve line with a rear end 20c of the running prediction locus 20 in the direction of a line normal to the radius of turning R. Further, the marker 20b can be calculated by a well known geometrical calculating method on the basis of the radius of turning R and accordingly, a detailed explanation will be omitted here.

Figure 14:
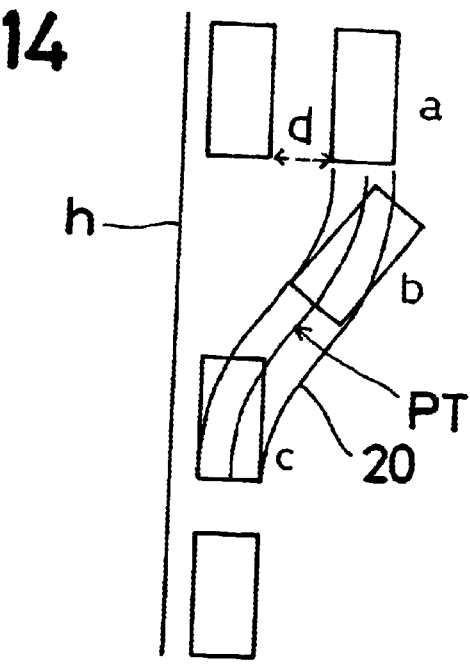
FIG. 14 is an explanatory view of the operation of parking along a longitudinal line.

Next, at step S109, the mode of parking is determined and in this case it is determined if the longitudinal line parking switch 4b is depressed. The longitudinal line parking switch 4b is operated by the driver in a state in which the driving vehicle is in position "a" spaced from a parked vehicle along a longitudinal line as shown in FIG. 14 by predetermined distance "d" (for example, 1 m) and the driving vehicle is stopped aligned in parallel with the parked vehicle by making rear portions thereof coincide with each other. Here, in the case of right angle parking, at step S110, the running prediction locus 20 is displayed on the display along with the rear image. Further, in this case, the above-described marker 20b can be displayed in line with the running prediction locus 20.

FIGS. 13A, 13B, 13C, 13D and 13E illustrate an example of the display screen in right angle parking on the display 13, showing a state in which the running prediction locus 20 is varied by the steering wheel angle including fixed loci 26 and 27 indicating loci when the steering 21 is turned by a maximum steering angle. In this case, the running prediction locus 20 constituted in a ladder-like shape can also be displayed to overlap an actual image of the rear side of the vehicle only in the case in which the parking switch 4 is ON (state of requesting parking assistance) in accordance with, for example, the preference of the driver. In this case, in order to see how much the driver turns the steering wheel 21, the amount the steering wheel 21 is turned can visually be known by display markers 14 which display the steering angle at a portion on the upper side or the lower side of the display 13. Further, in this case, a precautionary area 28 may be displayed in addition to the running prediction locus 20. The precautionary area 28 is displayed on the driving vehicle side of the display screen of the display where the rear image is displayed and a location where the driving vehicle might collide with an object in the parking operation is displayed by a separate frame shape having a mode of display different from that of the running prediction locus 20. The precautionary area 28 promotes safety by bringing the attention of the driver to the location where the vehicle is liable to collide with an object and specifically, for example, in a display frame having a rectangular shape, when the display color is made different at a side 28b of the display frame proximate to the driving vehicle and a side 28a thereof remote therefrom on the screen (the transverse line 28b is displayed in red color and the transverse line 28a is displayed in yellow color), an area having high degree of danger where the bumper of the driving vehicle or the like is liable to collide with an object can be displayed more clearly.

Next, an explanation will be given of the process of parking along a longitudinal line at step S111 and later steps. Normally, in parking along a longitudinal line, the driver finds a space where parking along a longitudinal line can be carried out at a side of a road and stops the vehicle. Thereafter, the driver turns the steering wheel 21 in a direction in which the driver intends to park the vehicle and at a position where the vehicle has regressed by a certain distance, the driver turns the steering wheel 21 in the counter direction to thereby bring the front end of the vehicle sideways and parks the vehicle in a state in parallel with a curb stone 40 at a location where a road shoulder or a sidewalk is provided. In this case, as shown by FIG. 14, when the vehicle runs on a locus having an S-like shape combined with two circular arcs having different centers of turning of the vehicle and regresses by a distance L, the vehicle is moved in the road width direction by a distance D in parallel with the road.

Figure 15:
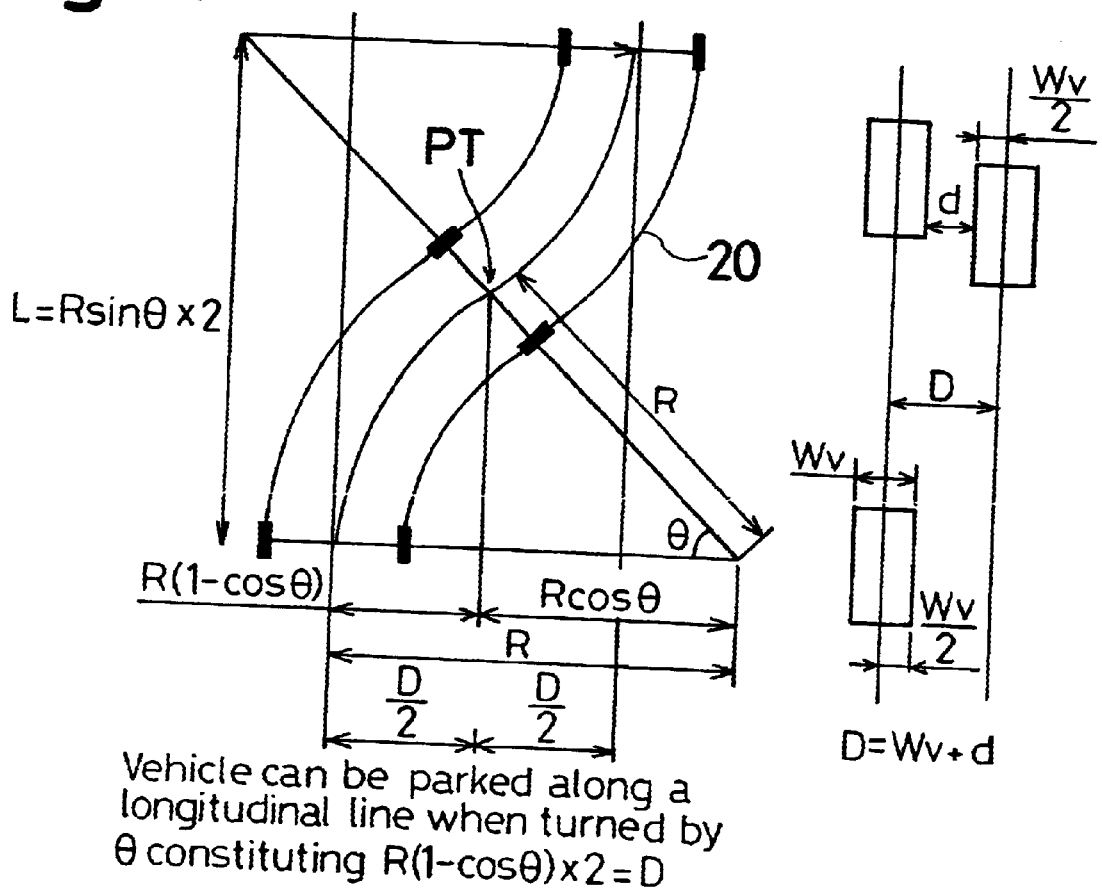
FIG. 15 is an explanatory view used in calculating a running prediction locus according to the embodiment of the invention.

In the case in which the radius of turning is designated by the notation R, when the running prediction locus 20a is displayed on the display by a length in correspondence with the distance L=R sin θ, (for example, about 6 m) which is previously determined geometrically by characteristics of the vehicle (wheel base, minimum radius of turning) (notation L does not designate a length of a curve), if there is present a parked vehicle or an object remote from the rearmost end 20c of the running prediction locus 20, the driver can foresee that the driving vehicle can be parked at an initial position (position "a" of FIG. 14) before starting the parking operation. In this case, when the driver turns the steering wheel 21 by a maximum steering wheel angle or an angle proximate thereto in a state in which the driving vehicle becomes in parallel with the vehicle parked along a longitudinal line, there is displayed the prediction locus 20a in an S-like shape having different centers of turning accompanied by a point of inflection PT. This can be calculated geometrically from the steering characteristic of the vehicle since the radius of turning R can be determined in correspondence with the amount of turning the steering wheel 21 and the moving distance L in the forward and rearward direction necessary for bringing the vehicle sideways by the predetermined distance D. Therefore, conversion into a projected image as viewed from the camera 17 is facilitated by the above-described method. Further, the radius of turning R of the vehicle can be calculated from steering angle information from the steering sensor 2 mounted on the steering shaft and the steering gear ratio and the wheel base of the vehicle. Further, in FIG. 15. when notation θ designates a rotational angle from the initial state of parking along a line to the point of turning PT of the steering wheel 21, notation Wv designates a vehicle width and notation D designates a distance between centers of vehicle widths of the vehicle already parked along a longitudinal line and the vehicle which the driver intends to park along the longitudinal line, there are established relationships of D=2R (1−cos θ) and D=Wv+d. For example, when R=4 m and θ=49.5° the minimum distance capable of parking along the longitudinal line is determined as D=6.08 m.

Figure 16A:
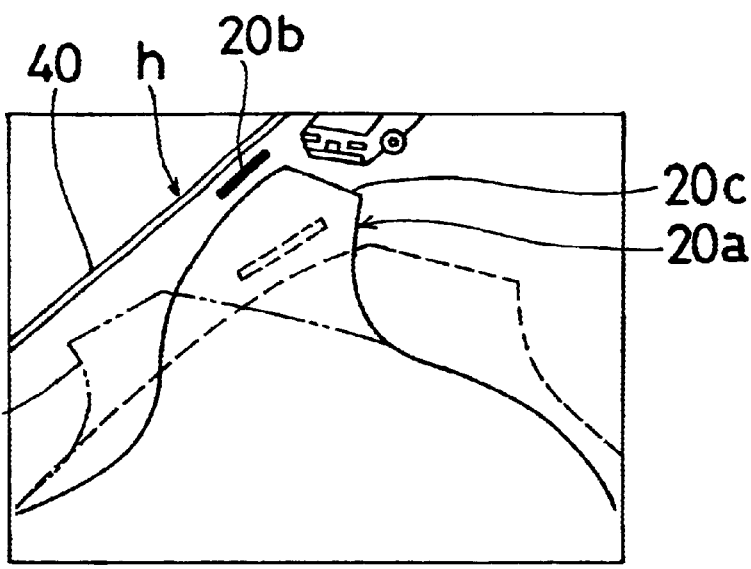
Figure 16B:
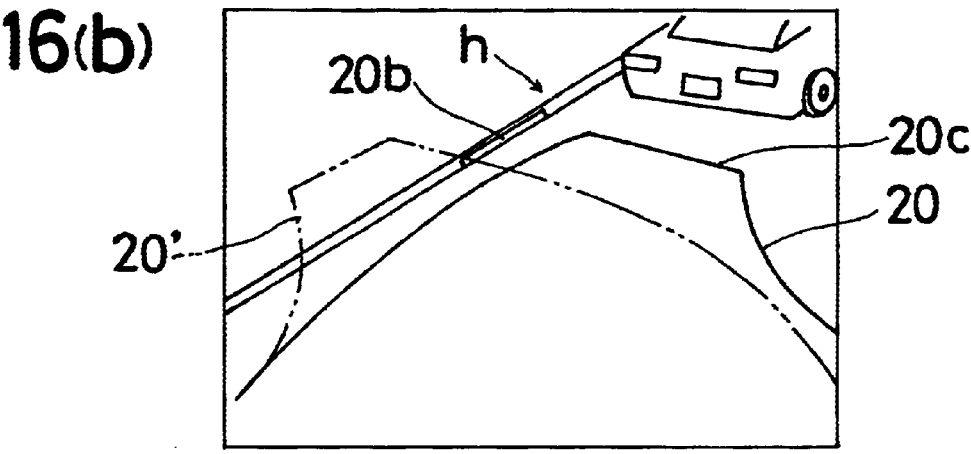
Figure 16C:
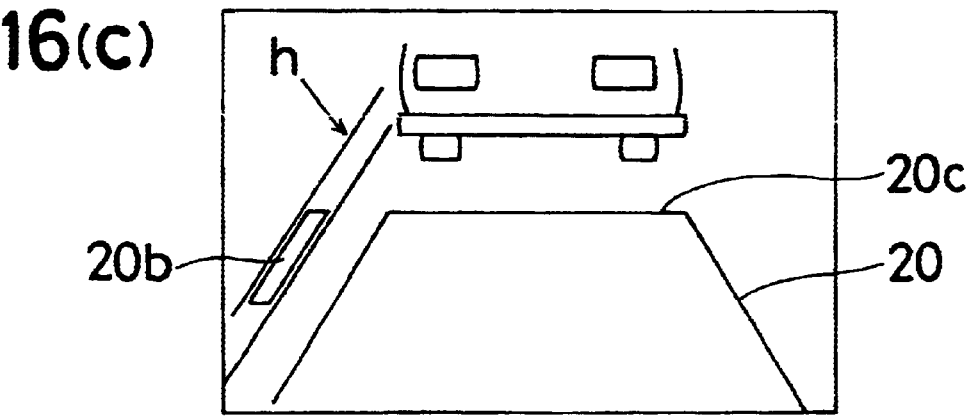

Returning to FIG. 5 and explaining the process in parking along a longitudinal line, at step S111, it is determined whether the vehicle is disposed at position "a" shown by FIG. 14. The position a indicates the state in which the vehicle is in parallel with the vehicle parked along a longitudinal line while being spaced therefrom by the predetermined distance "d" (1 m), that is, in the state, when the longitudinal line parking switch 4b is depressed in starting the longitudinal line parking to thereby start the parking operation, at step S111, there are displayed the running prediction locus 20a in the S-like shape and the marker 20b constituting an index in the parking operation (refer to bold lines shown in FIG. 16A). When the vehicle starts regressing, the running prediction locus 20a constituting the S-like shape is switched to a state of dotted lines shown by FIG. 16A. That is, when the vehicle starts regressing, the running prediction locus 20 in accordance with the current steering wheel angle at the point of inflection PT is displayed along with the marker 20b. Further, after passing through the point of turning back PT, the running prediction locus 20 and the marker 20b may be displayed as shown by FIG. 16C or may be distinguished from the display of these in accordance with the preference of the driver.

Thereafter, when the reverse state is determined by the state of the shift lever reverse switch 3 and when the reverse state is indicated, the parking operation is carried out and accordingly, the running prediction locus 20(20a) is displayed on the display screen. However, when the reverse state is not indicated, at step S115, the display on the display is turned OFF and the operation returns to step S102.

An explanation will subsequently be given of a parking sequence in a parking operation according to the present invention based on the above-described processes.

Case of Right Angle Parking

In FIG. 13A, initially, the vehicle is aligned to a reference position of parking assistance by making the vehicle regress such that the fixed loci 26 or 27 is brought into contact with a white line 31 at the parking section 30 on the remote side. In this case, the camera 17 is installed to reflect the circumstances of the road face at the rear of the vehicle by directing the optical axis downwardly at a position in the center of the rear portion of the vehicle disposed at a position of constant height from the ground and the operation is started by initially setting the vehicle to a pertinent reference position of parking assistance. First, the vehicle is stopped at the reference position of parking assistance such that the fixed locus 27 substantially overlaps a portion forward from the center of the white line 31. In this case, when the shift lever is brought into the reverse state, there is produced a screen shown by FIG. 13A. Further, an explanation will be given of a case in which the steering wheel angle is initially on a straight line (straight moving state).

On the screen of the display 13, there are overlappingly displayed the running prediction locus 20, the fixed locus line 26 on the right side, the fixed locus line 27 on the left side and the precautionary area 28 along with a live image of a parking lot at the rear of the vehicle. As described above, the fixed locus lines 26 and 27 correspond to an outer wheel line with respect to the loci of rear wheels of the vehicle when the steering wheel 21 is fully turned to the right or to the left, the precautionary area 28 provides a yardstick of the distance at the rear of the vehicle, the running prediction locus 20 constitutes a display in a ladder-like shape having a constant distance and accordingly, the running prediction locus 20 is displayed by a distance scale projected onto the road face. In this case, when the vehicle is made to regress and approaches an object at the rear thereof, due to the height of the object such as a bumper from the road face, the bumper of a rear vehicle appears to be disposed at a position A'. However, the regressing vehicle approaches point A of the rear vehicle which is more proximate to the regressing vehicle than the point A' (refer to FIG. 11). According to the display of the precautionary area 28, the display frame is displayed horizontally at an average position of the bumper height in order to resolve the difference therebetween and the display color or boldness of a display line is changed in accordance with the degree of danger to thereby convey the danger of contact in the regressing operation to the driver.

In FIG. 13B, the steering wheel 21 is successively turned and in this case, the running prediction locus 20 is aligned to the fixed locus 27 on the left side. At this occasion, the running prediction locus line 20 is made to coincide with the fixed locus 27 by carrying out stationary steering basically in a state in which the vehicle is stationary and in this case, when the steering wheel 21 is turned by a constant steering angle θ REF or more in a direction intended by the driver, the fixed locus 26 which is not on the steering side disappears from the display screen and only the fixed locus 27 in the steering direction is displayed.

In FIG. 13C, the driver causes the vehicle to regress while confirming the safety in the rearward direction or the side direction by the screen or direct optical observation under the state where the steering wheel 21 is held in the state of FIG. 13B to thereby make the vehicle approach the parking space 30.

In FIG. 13D, the vehicle enters the parking space and the driver turns the steering wheel 21 back to the straight condition. In this case, the driver determines by optical observation horizontal and vertical overlapping degrees of the precautionary area 28 and lines of the parking space 30 and when the driver turns the steering wheel 21 back to the straight condition, the display of the fixed locus line 27 disappears.

In FIG. 13E, the driver begins to stop the vehicle by making the vehicle regress while paying attention to the rear side. In the final state of approaching the parking section 30, the parking white line 31 cannot be caught in the field of view by the current camera attachment and a position of stopping a rear end portion of the vehicle cannot be confirmed. However, the precautionary area 28 is displayed at a height where a bumper of a vehicle on the rear side is supposed to be present when another vehicle is parked to the rear of the driving vehicle (hatched portion of FIG. 13E) and accordingly, attention is brought to the driver and the parking operation can pertinently be assisted such that the driving vehicle does not collide with another vehicle or is not brought into contact with an object in parking. Therefore, even a driver having a short driving history can easily determine the position for starting to turn the steering wheel and the amount of turning thereof from the reference position of parking and can simply park a vehicle.

Case of Parking Along a Longitudinal Line

In parking along a longitudinal line, the driver stops the vehicle such that a rear portion of the vehicle substantially aligns with a rear portion of a parked vehicle and parallel thereto with the driving vehicle spaced from the parked vehicle along the longitudinal line by the predetermined distance "d" (this is referred to as the initial position of parking along a longitudinal line). The driver operates to depress the longitudinal line parking switch 4b to make CPU 11 of the controller 16 recognize the intention of the driver who is going to park the driving vehicle along the longitudinal line. Thereafter, the driver turns the steering wheel 21 in a direction intended to park the vehicle to reach a state where the steering wheel 21 is fully turned or a state proximate thereto. Then, the controller 16 calculates the running prediction locus 20a in the S-like shape based on the characteristics of the vehicle (wheel base, minimum radius of rotation) previously stored in the memory and the steering wheel angle and overlappingly displays the running prediction locus on the rear image as viewed by the camera 17 on the display. In this case, the marker 20b is displayed to align with a side portion of the rear end 20c (to the side of the moving vehicle) of the running prediction locus 20a. In this way, the running prediction locus 20a in the S-like shape is displayed. The marker 20b is remote from the rear end 20c of the running prediction locus 20 or 20a in the vehicle width direction by a predetermined distance of about 30 cm and is displayed by a constant length of 50 through 100 cm forward from the rear end 20c with the marker width of about 10 cm. Further, display mode and display color of such a locus and the marker 20b can be changed in accordance with the preference of the driver. The marker 20b constitutes an index for parking and at the initial position for parking the vehicle along a longitudinal line, such as a road shoulder or curb stone 40, the driver can easily know whether the vehicle can be parked along the longitudinal line by whether the rear end 20c of the running prediction locus 20a in the 5-like shape is brought into contact with a parked vehicle on the rear side. When the driver determines that the vehicle can be parked along the longitudinal line h, that is the locus 20a in the S-like shape is not brought into contact with the rear vehicle, the vehicle is made to regress. When the vehicle starts regressing, display of the running prediction locus 20a in the S-like shape disappears and at this time, in FIG. 16A, there are displayed the running prediction loci 20 and 20' indicated by dotted lines and the marker 20b at a rear side portion of the locus 20. The running prediction locus 20 in this case is a locus at the point of inflection PT in accordance with the current steering wheel angle and the running prediction locus 20' is a locus in a direction in which the steering wheel 21 of the actual vehicle is turned before reaching the point of inflection PT.

When the driver starts the regressing operation, the running prediction locus 20 at the point of inflection PT is displayed along with the rear image and the actual locus 20' is displayed on the display. When the vehicle is made to regress such that the marker 20b becomes substantially parallel with the vehicle being parked or a road shoulder or the curb stone 40, the position of the marker 20b overlaps the above-described or becomes parallel therewith. The position of the vehicle at that occasion constitutes the point of inflection PT (refer to FIG. 16B) and the driver can easily recognize that the vehicle reaches the point of inflection PT on the display. In this case, when the steering wheel 21 is turned, the display direction of the running prediction locus 20' in the dotted lines is changed in accordance therewith and the driver carries out the steering operation such that the running prediction locus 20' coincides with the running prediction locus 20 and successively carries out the regressing operation.

When the locus 20' overlaps the locus 20 and the vehicle reaches the point of inflection PT, at this point, there is displayed the running prediction locus 20 at and after the point of inflection PT. Further, in this case, parking assistance may be carried out for the driver based on the running prediction locus 20 by using the display method shown by FIGS. 13A, 13B, 13C, 13D and 13E.

In this way, when the rear end 20c of the running prediction locus 20 appears to be in parallel with a parked vehicle on the rear side and spaced apart therefrom at a constant distance therebetween, or when the marker 20b overlaps a road shoulder, the curb stone 40 of the road or the white line 31, in the case in which the driver turns the steering wheel to the right, the point of inflection PT can easily be determined, and when the driver operates the steering wheel while monitoring the above-described display, the vehicle can be parked at a position in parallel with the parked vehicle or in parallel with a road side or the curb stone 40.

Further, when the parking operation is being assisted in this way, by outputting previously determined voice signals from the speaker 8 by the voice synthesizing circuit 7, outputting a previously determined voice message to the driver in accordance with the operational situation at that time and guiding the driver in the parking operation by voice, even a beginner driver who is not accustomed to a parking operation can properly be assisted.

According to the invention, when longitudinal line parking is instructed by parking instructing means, the running prediction locus having a point of inflection is displayed in accordance with the steering wheel angle and accordingly, in the case of parking along a longitudinal line, a driver can know whether the vehicle can be parked along the longitudinal line in a parking space on the rear side while staying at an initial position of the parking operation. In this case, the amount of steering necessary for parking the vehicle along the longitudinal line is known at an initial stage of the parking operation and accordingly, even a beginner can relaxedly carry out the parking operation.

When the running prediction locus is displayed within a predetermined range by which a vehicle can be parked along a longitudinal line in accordance with characteristics of the vehicle and a marker is displayed at a vicinity of a rear side face of the running prediction locus, operation and determination by the display position of the display marker can pertinently be carried out based on the marker.

Further, when there are provided regressing state detecting means for detecting a regressing state of a vehicle and inflection point determining means for determining a point of inflection in parking a vehicle along a longitudinal line by characteristics of the vehicle, when the vehicle starts regressing and the running prediction locus is switched to and displayed by a running prediction locus at and after the point of inflection in accordance with the steering wheel angle before the vehicle reaches the point of turning back, the regressing state can be detected and an operational state up to the point of inflection can be known pertinently by the position of the marker in conformity with an actual rear image. The timing of how much the steering wheel is turned and turned back becomes easy to determine on the screen displaying the rear side by the marker.

Further, in the case in which the position of the marker becomes parallel with a road side or a curb stone or when an end portion of the running prediction locus becomes parallel with a vehicle parked on the rear side of a location for parking the vehicle along the longitudinal line, the vehicle is regarded to reach the point of inflection and display of the running prediction locus is switched, after passing through the point of turning back, the running prediction locus is displayed in accordance with the steering wheel angle in conformity with the parking vehicle rear or the running prediction locus is displayed on a straight line to thereby indicate a state in which the steering wheel angle is at neutral or the display screen is distinguished to thereby change the display mode and the operational state can be made easy to understand for the driver.

What is claimed is:

1. A vehicle parking assistance apparatus comprising:

a camera for taking an image of a rear area of a vehicle in a parking operation, a calculating means for calculating a first running prediction locus having an S-shape from a current position to a target parking position on the basis of a steering angle of the vehicle at the current position, the first running position locus indicates a rear end position or a side end position of the vehicle at the target parking position, and a display displaying the rear image and the first running prediction locus superimposed on the rear image.

2. The vehicle parking assisting apparatus according to claim 1, further comprising:

regress state detecting means for detecting a regressing state of the vehicle; and inflection point determining means for determining a point of inflection in parking along a longitudinal line which is horizontal with a road side by a turning characteristics of the vehicle, and wherein the calculating means calculate a second running prediction locus before the point of the inflection and a third running prediction locus at and after the point of the inflection on the basis of the steering angle when the vehicle starts regressing before the vehicle reaches the point of inflection and the display displays the second and third running prediction locus instead of the first running prediction locus.

3. The parking assisting apparatus according to claim 2, wherein the third prediction locus indicates the rear end position or the side end position of the vehicle.

4. The parking assisting apparatus according to claim 3, wherein when the side end position of the third prediction locus becomes parallel with the road side or a curb stone or when the rear end position of the third prediction locus becomes parallel with a vertical line which is vertical with the road side, the position of the vehicle constitutes the point of inflection and the third prediction locus is displayed on the display instead of the second and the third prediction locus.

5. A vehicle parking apparatus comprising, a detecting means for detecting a steering angle of the vehicle at a current position, a calculating means for calculating a first running prediction locus from the current position to a target parking position based on the steering angle, the first running prediction locus including a rear end position of the vehicle at the target parking position, and a display displaying the first running prediction locus superimposed on a rear view of the vehicle.

6. The parking assisting apparatus according to claim 5, wherein the first running prediction locus includes a side end position of the vehicle at the target parking position.

7. The parking assisting apparatus according to claim 6, wherein the first running prediction locus includes a point of inflection.

8. The parking assistance apparatus to claim 7, wherein the calculating means calculates a second running prediction locus corresponding to the steering angle of the vehicle at the current position and the third running prediction locus that is symmetrical to the second running prediction locus and that includes the rear end position and the side end position of the vehicle, and the display displays the second and the third running prediction locus instead of the first running prediction locus superimposed on the rear view of the vehicle when the vehicle starts rearward movement.

9. The parking assistance apparatus according to claim 8, wherein the calculating means calculates a marker corresponding to the rear end and the side end of the vehicle at the target parking position, and the marker is superimposed on the display with the second running prediction locus and the rear view of the vehicle.

10. The parking assistance apparatus to claim 6, wherein the calculating means calculates a second running prediction locus corresponding to the steering angle of the vehicle at the current position and the third running prediction locus that is symmetrical to the second running prediction locus and that includes the rear end position and the side end position of the vehicle, and the display displays the second and the third running prediction locus instead of the first running prediction locus superimposed on the rear view of the vehicle when the vehicle starts rearward movement.

11. The parking assistance apparatus according to claim 10, wherein the calculating means calculates a marker corresponding to the rear end and the side end of the vehicle at the target parking position, and the marker is superimposed on the display with the second running prediction locus and the rear view of the vehicle.

12. The parking assisting apparatus according to claim 5, wherein the first running prediction locus includes a point of inflection.

13. The parking assistance apparatus to claim 12, wherein the calculating means calculates a second running prediction locus corresponding to the steering angle of the vehicle at the current position and the third running prediction locus that is symmetrical to the second running prediction locus and that includes the rear end Position and the side end position of the vehicle, and the display displays the second and the third running prediction locus instead of the first running prediction locus superimposed on the rear view of the vehicle when the vehicle starts rearward movement.

14. The parking assistance apparatus according to claim 5, wherein the calculating means calculates a second running prediction locus corresponding to the steering angle of the vehicle at the current position and the third running prediction locus that is symmetrical to the second running prediction locus and that includes the rear end position and the side end position of the vehicle, and the display displays the second and the third running prediction locus instead of the first running prediction locus superimposed on the rear view of the vehicle when the vehicle starts rearward movement.

* * * * *